(12) United States Patent
Jones et al.

(10) Patent No.: US 12,045,189 B2
(45) Date of Patent: *Jul. 23, 2024

(54) INTERFACE FOR RECEIVING AND RESPONDING TO A REQUEST TO TRANSFER

(71) Applicant: The Toronto-Dominion Bank, Toronto (CA)

(72) Inventors: Christopher Mark Jones, Villanova, PA (US); Barry Wayne Baird, Jr., Kennett Square, PA (US); Claude Bernell Lawrence, Jr., Philadelphia, PA (US); Jonathan Joseph Prendergast, West Chester, PA (US)

(73) Assignee: The Toronto-Dominion Bank, Toronto (CA)

( * ) Notice: Subject to any disclaimer, the term of this patent is extended or adjusted under 35 U.S.C. 154(b) by 10 days.

This patent is subject to a terminal disclaimer.

(21) Appl. No.: 17/953,728

(22) Filed: Sep. 27, 2022

(65) Prior Publication Data

US 2023/0015762 A1 Jan. 19, 2023

Related U.S. Application Data

(63) Continuation of application No. 17/182,557, filed on Feb. 23, 2021, now Pat. No. 11,487,693.

(51) Int. Cl.
*G06F 13/40* (2006.01)
*G06F 9/50* (2006.01)
(Continued)

(52) U.S. Cl.
CPC ........ *G06F 13/4068* (2013.01); *G06F 9/5061* (2013.01); *H04L 67/60* (2022.05); *H04L 67/62* (2022.05)

(58) Field of Classification Search
CPC ... G06F 13/4068; G06F 9/5061; H04L 67/60; H04L 67/62; H04L 69/10
See application file for complete search history.

(56) References Cited

U.S. PATENT DOCUMENTS 10,089,289 B2 10/2018 Sood
10,783,576 B1 * 9/2020 Van Os .............. G06Q 20/3227
(Continued)

OTHER PUBLICATIONS

CIPO, Examiner's Report relating to CA Application No. 3,116,112 dated Sep. 12, 2023.

*Primary Examiner* — Michael A Keller
*Assistant Examiner* — Thao D Duong
(74) *Attorney, Agent, or Firm* — Rowand LLP

(57) ABSTRACT

Methods and devices are provided for executing a data transfer based on one or more data transfer definitions. A signal representing a data transfer request is received from a first computing device. The data transfer request includes at least an identifier defining what is requested to be transferred. A notification of the data transfer request is sent to a second computing device. An interface including a plurality of interface elements for providing one or more data transfer definitions is sent to the second computing device. The interface includes at least one interface element that is pre-populated based on the data transfer request, and at least one interface element providing an option to define a time of day for a data transfer. The one or more data transfer definitions are received from the second computing device and the data transfer is executed based on the one or more data transfer definitions.

18 Claims, 6 Drawing Sheets

(51) Int. Cl.
   *H04L 67/60*   (2022.01)
   *H04L 67/62*   (2022.01)

(56) References Cited

U.S. PATENT DOCUMENTS

| | | | |
|---|---|---|---|
| 2005/0283436 A1* | 12/2005 | Greer | G07F 7/08 |
| | | | 705/40 |
| 2012/0317015 A1* | 12/2012 | Cohen | G06Q 40/03 |
| | | | 705/38 |
| 2012/0330825 A1* | 12/2012 | Shakkarwar | G06Q 20/24 |
| | | | 705/39 |
| 2013/0085936 A1* | 4/2013 | Law | H04L 12/1471 |
| | | | 705/40 |
| 2014/0012745 A1* | 1/2014 | Hanson | G06Q 20/102 |
| | | | 705/40 |
| 2016/0104237 A1* | 4/2016 | Kanjlia | G06Q 20/227 |
| | | | 705/35 |
| 2016/0117651 A1* | 4/2016 | Davis | G06Q 20/3255 |
| | | | 705/40 |
| 2016/0239322 A1* | 8/2016 | Watanabe | G06F 9/45558 |
| 2018/0268487 A1* | 9/2018 | Matthews | G06Q 40/06 |
| 2019/0340564 A1 | 11/2019 | Holmquist | |
| 2020/0294128 A1* | 9/2020 | Cella | H04L 9/3239 |
| 2021/0004897 A1* | 1/2021 | Van Os | G06F 21/31 |
| 2021/0019718 A1* | 1/2021 | Moskowitz | G06Q 20/14 |
| 2021/0082043 A1* | 3/2021 | Kanjlia | G06Q 20/108 |
| 2021/0096886 A1* | 4/2021 | McLachlan | G06F 3/0481 |
| 2021/0103929 A1* | 4/2021 | Cheng | G06Q 20/102 |
| 2021/0142328 A1 | 5/2021 | Sylvester et al. | |
| 2021/0201404 A1 | 7/2021 | Schwartz | |
| 2022/0180406 A1 | 6/2022 | Palty | |
| 2022/0365643 A1* | 11/2022 | Triverio | H04M 1/72439 |
| 2023/0135058 A1* | 5/2023 | Feuerstein | G06Q 30/0236 |
| | | | 705/7.19 |
| 2023/0237480 A1* | 7/2023 | Miller | G06F 21/31 |
| | | | 705/75 |

\* cited by examiner

700

INVOICE DETAILS

Generic Wholesale

| INVOICE NUMBER | 0483 |
| AMOUNT DUE | $275.61 |
| DUE DATE | Feb 01 2021 |
| PAYMENT AMOUNT | $ 275.61 ▼ | — 710
| PAYMENT DATE | Feb 01 2021 ▼ | — 720
| PAYMENT TIME | 09:00:00 ▼ | — 730

SUBMIT

FIG. 7

INTERFACE FOR RECEIVING AND RESPONDING TO A REQUEST TO TRANSFER

TECHNICAL FIELD

The present application relates to data transfers and, more particularly, to systems and methods for completing a transfer from a record in a database using a real time protocol.

BACKGROUND

It is sometimes necessary or desirable to conduct transfers between database records. For example, transfers are sometimes made from a first record to a second record. The transfers may sometimes occur within the same database and sometimes the transfers may occur between different databases. In some instances, the databases may reside on different systems which may connect to one another through a network. The various databases may be configured to support different protocols for transfers to other databases. For example, some databases may support high-speed protocols whereas others may support only low-speed protocols. In some cases, low-speed protocols may take several days before a data transfer is completed whereas high-speed protocols may even support real time transfers.

Transfer management and configuration interfaces often do not take into account a transfer protocol that will be used to complete a transfer. For example, in many cases, a transfer management and configuration interface may be the same for high-speed transfers and for low-speed transfers.

BRIEF DESCRIPTION OF THE DRAWINGS

Embodiments are described in detail below, with reference to the following drawings:

FIG. 7 is an example interface according to an embodiment.

Like reference numerals are used in the drawings to denote like elements and features.

DETAILED DESCRIPTION OF VARIOUS EMBODIMENTS

Figure 1:
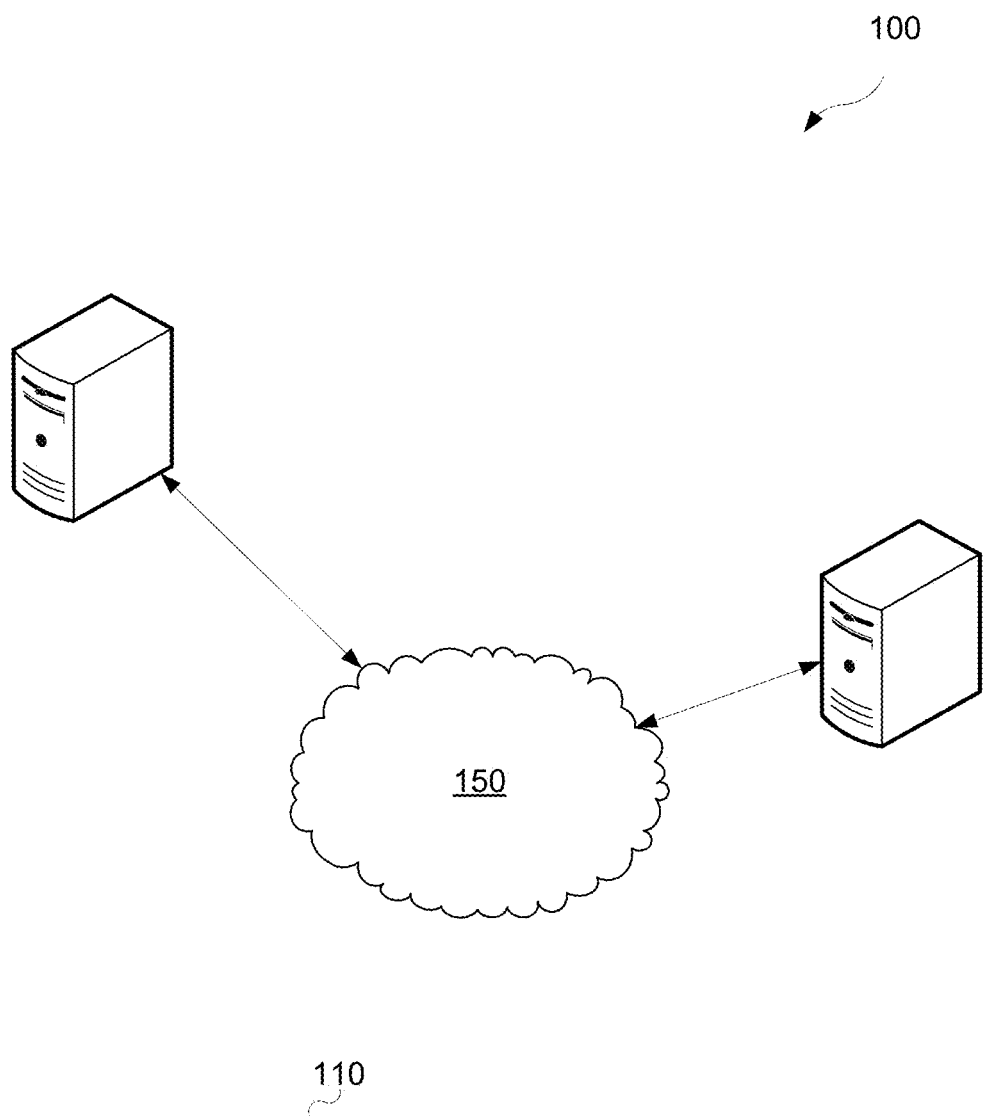
FIG. 1 is a schematic operation diagram illustrating an operating environment of an example embodiment.

In one aspect of the present disclosure there is provided a server. The server may include a communications module, a processor coupled with the communications module and a memory coupled to the processor. The memory may store processor-executable instructions which, when executed by the processor, configure the processor to: receive, via the communications module and from a first computing device, a signal representing a data transfer request, the data transfer request including an identifier defining what is requested to be transferred; send, via the communications module and to a second computing device, a notification of the data transfer request; send, via the communications module and to the second computing device, an interface including a plurality of interface elements for providing one or more data transfer definitions, the plurality of interface elements including at least one interface element that is pre-populated based on the data transfer request, and at least one interface element providing an option to define a time of day for a data transfer; receive, via the communications module and from the second computing device, the one or more data transfer definitions; and execute the data transfer based on the one or more data transfer definitions.

In at least some implementations, the at least one interface element that is pre-populated based on the data transfer request may be pre-populated based on the identifier defining what is requested to be transferred.

In at least some implementations, the at least one interface element that is pre-populated based on the data transfer request may be configured to allow modification of the pre-populated interface element.

In at least some implementations, the data transfer may be executed using a real time transfer protocol at the defined time of day.

In at least some implementations, the instructions may further configure the processor to determine whether a real-time protocol may be used to execute the data transfer. The instructions may further configure the processor to include the at least one interface element providing the option to define the time of day when the real-time protocol may be used.

In at least some implementations, determining whether the real-time protocol may be used to execute the data transfer may be based on one or more of an identity of a transferee, an identity of a system operator associated with the transferee and a type of the data transfer request.

In at least some implementations, the processor may be further configured to include the at least one interface element providing the option to define the time of day when a record associated with the data transfer request does not have what is requested to be transferred at the time of display of the interface element.

In at least some implementations, the plurality of interface elements may include at least one interface element providing the option to define a date for the data transfer.

In at least some implementations, the at least one interface element providing the option to define a time of day may allow definition to a nearest minute.

In at least some implementations, the at least one interface element providing the option to define a time of day may allow definition to a nearest second.

In at least some implementations, the instructions may further configure the processor to, when the data transfer includes a borrowed resource, determine an elapsed time of use of the borrowed resource beginning with the defined time of day and the defined date of the data transfer.

In at least some implementations, the instructions may further configure the processor to determine an amount of resources to be transferred in a further transfer based on the elapsed time of use.

In at least some implementations, the at least one interface element providing the option to define the time of day may be pre-populated with a time that is within an hour of midnight.

According to another aspect, the present application describes a computer-implemented method of executing a data transfer based on one or more data transfer definitions.

The method may include receiving, via a communications module and from a first computing device, a signal representing a data transfer request including an identifier defining what is requested to be transferred. The method may further include sending, via the communications module and to a second computing device, a notification of the data transfer request. The method may further include sending, via the communications module and to the second computing device, an interface which may include a plurality of interface elements for providing one or more data transfer definitions. The interface may include at least one interface element that is pre-populated based on the data transfer request, and at least one interface element providing an option to define a time of day for a data transfer. The method may further include receiving, via the communications module and from the second computing device, the one or more data transfer definitions and executing the data transfer based on the one or more data transfer definitions.

In at least some implementations, the at least one interface element that is pre-populated based on the data transfer request may be pre-populated based on the identifier defining what is requested to be transferred.

In at least some implementations, the at least one interface element that is pre-populated based on the data transfer request may be configured to allow modification of the pre-populated interface element.

In at least some implementations, the data transfer may be executed using a real time transfer protocol at the defined time of day.

In at least some implementations, the method may further include determining whether a real-time protocol may be used to execute the data transfer, and including the at least one interface element providing the option to define the time of day when the real-time protocol may be used.

In at least some implementations, determining whether the real-time protocol may be used to execute the data transfer may be based on one or more of an identity of a transferee, a system operator associated with the transferee and a type of the data transfer request.

In at least some implementations, the method may further include including the at least one interface element providing the option to define the time of day when a record associated with the data transfer request does not have what is requested to be transferred at the time of display of the interface element.

In at least some implementations, the plurality of interface elements may include at least one interface element providing the option to define a date for the data transfer.

In at least some implementations, the at least one interface element providing the option to define a time of day may allow definition to a nearest minute.

In at least some implementations, the at least one interface element providing the option to define a time of day may allow definition to a nearest second.

In at least some implementations, the method may include, when the data transfer includes a borrowed resource, determining an elapsed time of use of the borrowed resource beginning with the defined time of day and the defined date of the data transfer.

In at least some implementations, the method may further include determining an amount of resources to be transferred in a further transfer based on the elapsed time of use.

In at least some implementations, the at least one interface element providing the option to define the time of day may be pre-populated with a time that is within an hour of midnight.

According to yet another aspect there is provided a non-transitory computer-readable storage medium comprising computer-executable instructions which, when executed, configure a processor to perform a method described herein. In one example, the computer-executable instructions, when executed, configure a processor to: receive, via a communications module and from a first computing device, a signal representing a data transfer request, the data transfer request including at least a requested transfer amount send, via the communications module and to a second computing device, a notification of the data transfer request send, via the communications module and to the second computing device, an interface the interface including a plurality of interface elements for providing one or more data transfer definitions, the plurality of interface elements including at least one interface element that is pre-populated based on the data transfer request, and at least one interface element providing an option to define a time of day for a data transfer; receive, via the communications module and from the second computing device, the one or more data transfer definitions; and execute the data transfer based on the one or more data transfer definitions.

Conveniently, in this way, when a real time transfer protocol is available, an interface may allow a transfer to be scheduled with precise timing. For example, a transfer may be scheduled to occur at a specified time of day. In at least some implementations, when the real time transfer protocol is not available to complete the transfer, the interface may not allow a time of day to be defined. Instead, the interface may only permit a date to be specified.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a block diagram illustrating an operating environment of an example embodiment. Various components cooperate to provide a system 100 which may be used, for example, to perform an operation. As shown, the system 100 includes a client device 110, a first server 130 and a second server 140 coupled to one another through a network 150, which may include a public network such as the Internet and/or a private network. The client device 110 is a computing device that may be associated with an entity, such as a user or client, having a record in a database associated with and/or provided by the first server 130. The record may be or represent account data. The record may include data of various types and the nature of the data will depend on the nature of the first server 130.

By way of example, in some implementations, the first server 130 may maintain user accounts and a record in the database may be or represent an account. The record may include, for example, documents and/or other data stored by or on behalf of a user. By way of example, in an implementation, a user account may include documents or data uploaded by the user. Such documents and/or data may include, for example, any one or more of: images such as photographs, text-based documents, documents prepared according to a standardized file format, such as portable document format (PDF) documents, user preferences, digital identity data such as stored identity information or documentation, or other types of documents and/or data. For example, in an implementation, the first server may track, manage, maintain, and/or provide resources to the entity. The resources may, for example, be computing resources, such as memory or processor cycles. By way of further example, the resources may include stored value, such as fiat currency, which may be represented in a database. For example, the first server 130 may be coupled to a database 180, which may be provided in secure storage. The secure storage may be provided internally within the first server 130 or externally. The secure storage may, for example, be provided remotely from the first server 130. For example, the secure storage may include one or more data centers. The data centers may, for example, store data with bank-grade security.

The database 180 may include records associated with a plurality of entities. For example, the records may be for a plurality of accounts and at least some of the records may define a quantity of resources. For example, the entity that is associated with the client device 110 may be associated with an account having one or more records in the database. The records may reflect a quantity of stored resources that are associated with the entity. Such resources may include owned resources and, in at least some embodiments, borrowed resources. The resources that are associated with an entity may be grouped into various buckets. Some such buckets may, for example, represent individual bank accounts. For example, an entity may be associated with one or more bank accounts. At least some of the resources may be borrowed resources. The borrowed resources may, for example, represent an amount of credit that is available to the entity. The entity that is associated with the client device 110 and the account may be a customer of a financial institution which operates or manages the first server 130.

The first server 130 and the second server 140 may be operated by different entities. That is, the first server 130 may be associated with a first system operator and the second server 140 may be associated with a second system operator who is different than the first system operator. The second server 140 may be, for example, associated with a financial institution server that is associated with a different financial institution than a first server 130 and may maintain customer financial accounts. That is, the second server 140 may maintain a database that includes various data records. A data record may, for example, reflect an amount of value stored in a particular account associated with a user.

While not illustrated in FIG. 1, the second server 140 may include or be connected with a database that operates similar to the database 180 that provided by or associated with the first server 130.

The first server 130 and second server 140 may store other data instead of or in addition to financial account data. By way of example, as noted above, in some implementations, the first server 130 and the second server 140 may manage computing resources such as memory and/or processor cycles which may be used by the client device 110. The records may, for example, associate a particular entity with particular computer resources. For example, the records may entitle a particular entity exclusive or shared use of a computing resource. The servers 130, 140 may communicate with one another in order to transfer a token that allows use of a computing resource from a record maintained by the first server 130 to a record maintained by the second server 140.

In another example, the servers 130 may act as cloud-based storage and may store files, such as documents for various entities. A first server 130 may, in accordance with instructions received from an entity associated with a document, transfer that document to another entity having a record at the second server 130. By way of example, the document may be a media file, such as a electronic book, video file or audio file, having digital rights management (DRM) which only permits the document to be transferred if exclusive use of the document is transferred (i.e., if the transfer is performed such that the transferor is no longer able to use the document after the transfer). The servers 130, 140 may communicate with one another in order to transfer the document in accordance with instructions received from the client device 110.

The client device 110 may take a variety of forms such as a smartphone, a tablet computer, a wearable computer such as a head-mounted display or smartwatch, a laptop or desktop computer, or a computing device of another type. The first server 130 and/or the second server 140 may be referred to as first and second computing devices respectively and the client device 110 may be referred to as a third computing device. In certain embodiments, the client device 110 may be adapted to present a graphical user interface that allows for communication with the first server 130. For example, the second server 140 may be adapted to send a signal representing a data transfer request to the first server 130. The first server 130 may be adapted to send, to the client device 110, a notification of the data transfer request and an interface for selecting one or more associated data transfer definitions. The client device 110 may be adapted to send, to the first server 130, an indication of the selection of the data transfer definitions through the graphical user interface that allows for communication with the first server 130.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, a telecommunications network, or the like.

The first server 130 may be configured to communicate with other servers, such as the second server 140 using one or more communication protocols, which may also be referred to as transfer protocols or transfer rails. The speed of the transfer protocols supported by the servers may vary. For example, at least one transfer protocol that is supported by the first server 130 may be a real time transfer protocol and at least one transfer protocol that is supported by the first server 130 may be a non-real time transfer protocol. The non-real time transfer protocol may, in at least some implementations, take more than one hour to complete a transfer. In some implementations, the non-real time transfer protocol may take twenty four (24) hours or more to complete the transfer.

Some servers may not support some transfer protocols. For example, a third server (not shown) may not support the real time transfer protocol while the second server 140 may support the real time transfer protocol. In another implementation, the second server 140 may not support the real time transfer protocol but the third server may support the real time transfer protocol.

The real time transfer protocol may allow a transfer to be completed in real time or near real time. For example, a transfer may be completed in twenty seconds or less in at least some implementations. In some implementations, a transfer may be completed in five (5) seconds or less.

One or more of the transfer protocols supported by the first server 130 may, in at least some implementations, operate through a third-party server 160.

In at least some embodiments, a third-party server 160 may be a transfer rail server configured to facilitate a transfer from a first data record to a second data record according to a first transfer protocol. The first data record may be a data record maintained by the first server 130 and the second data record may be a data record maintained by a server associated with a different system operator than the first server 130 (e.g., such as the second server 140). The transfer rail server may be a real-time transfer rail server and may be configured to process the transfer in real-time or near real-time. The transfer rail server may operate as an intermediary between the first server 130 and the second server 140.

While not depicted in FIG. 1, in at least some implementations, the system 100 includes a further third-party server which acts as a further transfer rail server. The further third-party server may facilitate transfers between the first server 130 and the second server 140 according to a second transfer protocol. The second transfer protocol may be a non-real time transfer protocol.

One or more of the transfer protocols may not require the use of a third-party server. For example, one or more of the transfer protocols may operate through the exchange of messages directly between the first server 130 and the second server 140. Such messages may be exchanged through the network 150.

The client device 110, the first server 130, the second server 140 and the third-party server 160 may be in geographically disparate locations. Put differently, the client device 110, the first server 130, the second server 140, and the third-party server 160 may be remote from one another.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
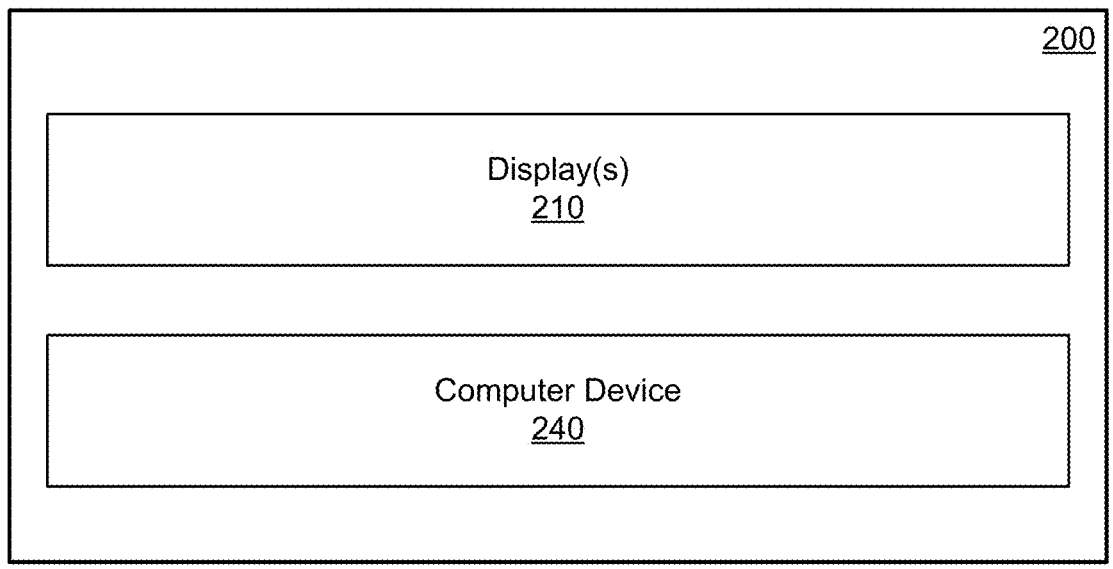
FIG. 2 is a simplified schematic diagram showing components of a computing device.

FIG. 2 is a simplified schematic diagram showing components of an exemplary computing device 200. The client device 110 may be of the same type as computing device 200. The computing device 200 may include modules including, as illustrated, for example, one or more displays 210 and a computer device 240.

The one or more displays 210 are a display module. The one or more displays 210 are used to display screens of a graphical user interface that may be used, for example, to communicate with the first server 130 (FIG. 1). The one or more displays 210 may be internal displays of the computing device 200 (e.g., disposed within a body of the computing device).

The computer device 240 is in communication with the one or more displays 210. The computer device 240 may be or may include a processor which is coupled to the one or more displays 210.

Figure 3:
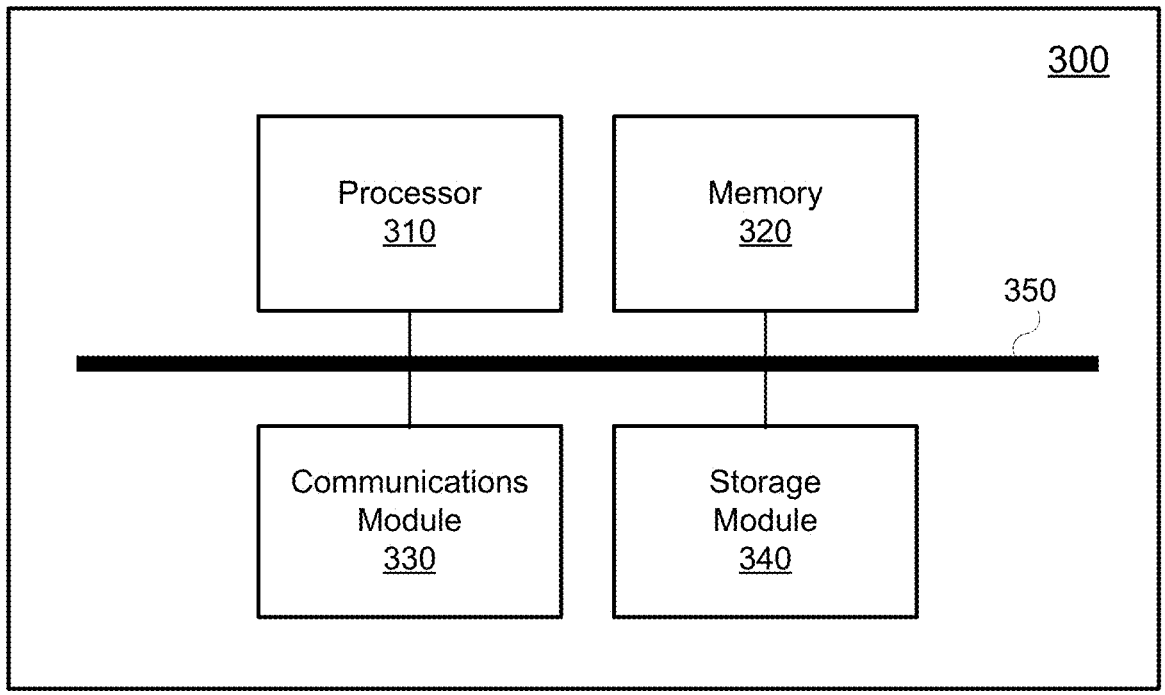
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the first server 130, the client device 110, the second server 140 and/or the third-party server 160.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Where the example computer device 300 functions as the first server 130 of FIG. 1, the storage module 340 may allow the example computing device 300 to access the secure data in the database 180.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
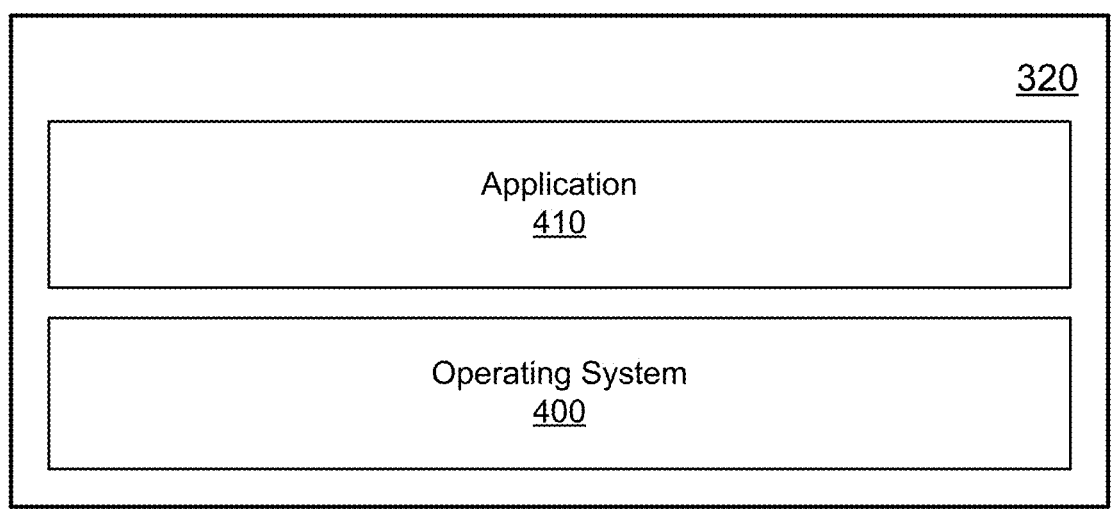
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the first server 130, the administrator device 170, the third-party server 160 and/or the second server 140.

While a single application 410 is illustrated in FIG. 3, in operation the memory 320 may include more than one application 410 and different applications 410 may perform different operations. For example, in at least some embodiments in which the computer device 300 is functioning as the client device 110, the applications 410 may include a transfer initiation application. The transfer initiation application may be configured for secure communications with the first server 130 and may provide various functions such as, for example, the ability to display data in a record in the database 180. In some implementations, the transfer initiation application may be a banking application which may, for example, be configured to display a quantum of value in one or more data records (e.g. display balances), configure or request that operations such as transfers of value (e.g. bill payments, email money transfers and other transfers) be performed, and perform other account management functions.

By way of further example, in at least some embodiments in which the computer device 300 functions as the client device 110, the applications 410 may include a web browser, which may also be referred to as an Internet browser. In at least some such embodiments, the first server 130 may be or include a web server that may serve one or more of the interfaces described herein. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions.

The first server 130 is configured to receive and complete data transfer requests. A transfer may be a transfer of documents and/or a token. In another example, a transfer may be a transfer of value or other resources from a first account to a second account. The first server 130 is configured to complete received data transfer requests according to one or more transfer methods (which may also be referred to herein as transfer protocols). For example, a first transfer method may utilize a real-time transfer rail server configured to process the transfer in a first transfer time which may be real-time or near real-time. A second transfer method may utilize a transfer rail server configured to process the transfer in a second transfer time that is longer than the first transfer time. Additional transfer methods may also be used.

The first server 130 may determine a transfer method to be used based on the identity of the transferee, the identity of a system operator associated with the recipient, the amount of resources to be transferred and/or the nature of the transfer request. For example, the first server 130 may determine whether the system operator associated with the recipient supports real-time transfers. That is, the first server 130 may determine if real-time transfers and/or a real-time protocol may be used in processing transfers associated with the particular system operator (i.e., the system operator that operates a second server 140 that is to receive the transfer). Additionally, or alternatively, the first server 130 may determine whether the network from which the transfer request was received supports real-time or at real-time transfers, that is, if real-time transfers and/or a real-time protocol may be used in processing transfers associated with the particular network. In at least some implementations, the first server 130 may determine which of a plurality of transfer methods are available. The first server 130 may present, to the transferor, an interface for providing one or more data transfer definitions that is consistent with the determined transfer method(s). When the first server 130 receives the one or more data transfer definitions, the first server 130 may complete the data transfer based on the one or more data transfer definitions.

The first server 130 may receive a data transfer request from the second server 140. The data transfer request may include an identifier defining what is requested to be transferred. For example, in one implementation, the identifier may identify a document or token that is to be transferred. In another implementation, the identifier may indicate a requested transfer amount. The data transfer request may identify a record from which the transfer is requested to be made. For example, the data transfer request may include an account identifier. The account identifier may be an account number, for example. In some implementations, the account identifier may be or include an alias for an account identifier such as a name or email address or phone number. In some embodiments, the data transfer request may include a requested transfer date, a requested transfer time and/or other information related to the data transfer request such as an invoice number. The first server 130 may send a notification of the data transfer request to the client device 110. In some embodiments, the server 130 may provide an interface to the client device 110. In some embodiments, the interface may include interface elements to allow a user to define various aspects of the requested data transfer. One or more of the interface elements may be pre-populated by the first server 130 based on information provided in the data transfer request. For example, an interface element may be pre-populated based on the identifier defining what is requested to be transferred.

In some embodiments, the various aspects of the requested data transfer that may be defined may include a transfer amount. The transfer amount may represent an amount of something that is to be transferred, such as an amount of resources. In some implementations, the transfer amount may be fixed, that is, the transfer amount may be equal to the requested transfer amount and a user may be prevented from modifying the transfer amount through the interface. However, in some implementations, the transfer amount may be defined by a user, for example, through an associated interface element which may be pre-populated with the requested transfer amount. In some embodiments, a user may wish to define the transfer amount to an amount less than the requested transfer amount. For example, a user may not have sufficient resources available to complete a transfer of the full amount and may therefore define the transfer amount to reflect an available amount of resources. In some embodiments, a user may wish to define the transfer amount to an amount greater than the requested amount. For example, a user may be aware of a future transfer request from the same transferor and may therefore wish to transfer an amount of resources that includes the requested transfer amount and the future transfer amount.

In some embodiments, the various aspects of the requested data transfer that may be defined may include a transfer date. In some implementations, the transfer date may be fixed. For example, the transfer date may be equal to a requested transfer date (which may be defined in the data transfer request) and a user may be prevented from defining the transfer date. However, in some implementations, the transfer date may be definable by a user, for example, through an associated interface element. The associated interface element may be pre-populated with the requested transfer date. In some embodiments, a user may wish to define the transfer date to a date earlier than the requested transfer date. In some embodiments, a user may wish to define the transfer date to a date later than the requested transfer date. For example, a user may not have sufficient resources to complete a transfer of the amount on the requested transfer date and may therefore define the transfer date to be a future date when the user will have sufficient resources to complete the transfer. In some implementations, the transfer date may be defined by a user only within certain limits. For example, the transfer date may be defined to be a date within two weeks of the requested transfer date.

In some embodiments, the various aspects of the requested data transfer that may be defined may include the transfer time of day. In some implementations, the transfer time of day may be fixed. That is, the transfer time of day may be pre-selected and a user may be prevented from defining the transfer time of day. However, in some implementations, the transfer time of day may be definable by a user; for example, through an associated interface element. The associated interface element may be pre-populated based on defined criteria. In some embodiments, a user may wish to define the transfer time of day to be an earlier or later time of day. For example, a user may not have sufficient resources to complete a transfer of the full amount on the transfer date at a particular time of day and may therefore use the associated interface element to define a time of day at which the transfer amount will be available to the user. For example, the user may select a later time of day to provide the opportunity to engage to increase an amount in the record. For example, where the amount represents fiat currency, the user may engage in certain activity to top-up the account, such as performing ride-share services, in order to acquire sufficient resources before the transfer time of day.

In some embodiments, the interface element associated with the transfer time of day may be pre-populated. For example, the interface element associated with the transfer time of day may be pre-populated with a time that is at or near an end of day. For example, the pre-populated time may be within an hour of midnight, e.g., 23:30:00. Alternatively, the pre-populated time may be near the close of business time, e.g., within an hour of the close of business time, e.g., 18:00:00.

In some embodiments, an interface element for defining a transfer time of day may not be provided. For example, upon determining that a user has sufficient resources with which to provide the full requested transfer amount, an interface element for defining a transfer time of day may not be provided. In some embodiments, an interface element for defining a transfer time of day may only be provided when sufficient resources with which to provide the full requested transfer amount are unavailable.

In some embodiments, the interface element for defining a transfer time of day may provide an option to define the transfer time of day to the nearest hour. In some embodiments, the interface element for defining a transfer time of day may provide an option to define the transfer time of day to the nearest minute. In some embodiments, the interface element for defining a transfer time of day may provide an option to define the transfer time of day to the nearest second.

In some embodiments, a user may make use of borrowed resources to complete a transfer. In some implementations, the first server 130 may use the defined time of day of the transfer to calculate an elapsed time of use of the borrowed resource. For example, if a user were to use borrowed resources to complete a transfer on Feb. 1, 2021 at 11:32:45, and was to replenish the borrowed resources on Feb. 10, 2021 at 24:00:00, the first server 130 may calculate the elapsed time of use of the borrowed resources as 8 days, 12 hours, 27 minutes, and 15 seconds. Additionally or alternatively, the first server 130 may calculate the elapsed time of use as 9 days. Additionally or alternatively, the first server 130 may calculate the elapsed time of use as 204 hours. Additionally or alternatively, the first server 130 may calculate the elapsed time of use as 12,267 minutes. Additionally or alternatively, the first server 130 may calculate the elapsed time of use as 736,035 seconds.

When borrowed resources are used, the user may be required to, in the future, not only replenish the borrowed resources that were used, but also to transfer a further amount of resources to an account associated with the first server 130 (e.g., a modifier such as an interest modifier may be applied). In some embodiments, the first server 130 may determine the further amount of resources based on the elapsed time of use. The first server 130 may determine the further amount of resources based on a borrowing period which is determined to one or more of: the newest second, minute or hour. In this way, the modifier may be applied without rounding the borrowing period to the nearest day or without rounding up to the next day.

Figure 5:
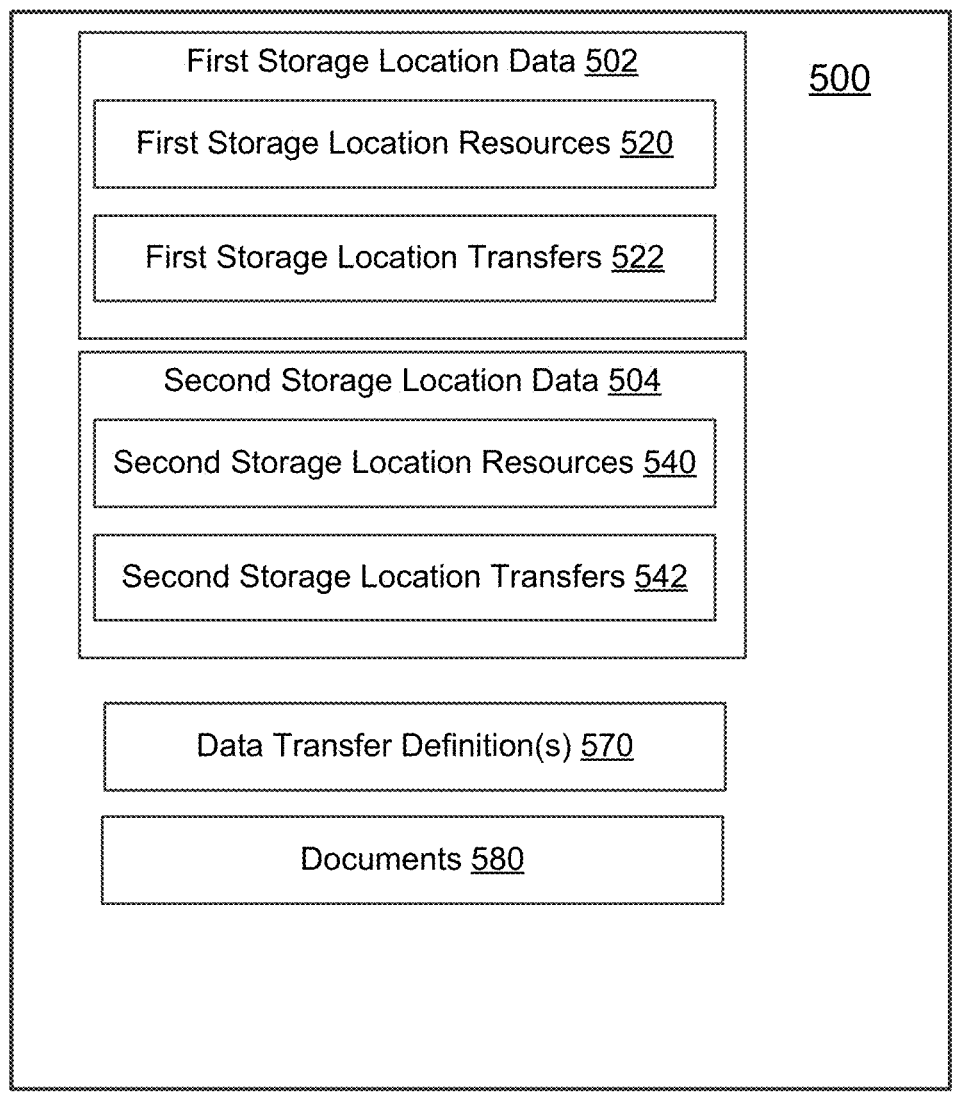
FIG. 5 is a block diagram of an example entity account record.

Reference will now be made to FIG. 5, which illustrates an example record 500 for an entity account. The entity account may, for example, be an account with a system operator. The record 500 may be stored in the database 180 (FIG. 1). The record 500 may be referred to, for example, as an entity record, an account record, or an entity account record.

The record 500 includes data associated with the entity. For example, the record 500 may include resource availability data. The resource availability data may include data representing resources owned by the entity and/or resources available for borrowing by the entity. The record 500 may include resource availability data for a plurality of storage locations. These storage locations, which may also be referred to as buckets or virtual stores, may represent individual bank accounts that are each associated with the entity. The example record 500 includes first storage location data 502 and second storage location data 504. The first storage location data 502 may, in an implementation, represent a first bank account and the second storage location data 504 may represent a second bank account. The first storage location data 502 may include first storage location resources 520 and first storage location transfers 522. The first storage location resources 520 may represent a current amount of resources stored in, represented by, or otherwise associated with the first storage locations. For example, the first storage location resources 520 may represent a current bank balance for the first storage location.

The first storage location transfers 522 may be a transfer listing for the first storage location. For example, the first storage location transfers 522 may identify completed (i.e., posted), pending (i.e., authorized transfers awaiting completion) and/or scheduled transfers that are associated with the first storage location. Transfers may represent the transfer of resources between records. Accordingly, a transfer may also be referred to as a data transfer.

The first storage location transfers 522 may represent both incoming and outgoing transfers for the first storage location. In implementations in which the transfers represent a transfer of resources, incoming transfers may be referred to as credits whereas outgoing transfers may be referred to as debits. Incoming transfers have an effect of increasing the availability of resources in the first storage location and outgoing transfers have the effect of decreasing the availability of resources in the first storage location. In at least some implementations, incoming transfers, therefore, represent the receipt of additional resources, whereas outgoing transfers represent the removal of resources.

The second storage location data 504 also includes resources (referred to as the second storage location resources 540) and transfers (referred to as the second storage location transfers 542). These are similar to the first storage location resources 520 and the first storage location transfers 522 except that the second storage location resources 540 and the second storage location transfers 542 refer to data associated with the second storage location.

As noted previously, in some implementations, the record may store other data instead of or in addition to the first storage location data 502 and the second storage location data 504. For example, the record 500 may include one or more documents. The documents may be, for example, text, audio, video and/or multi-media documents. In at least some implementations, one or more of the documents may be copy-protected documents. In at least some implementations, the copy-protected documents may be protected with digital rights management (DRM) such that, when a document is transferred from a first record to a second record, it is automatically deleted from the first record or rendered inoperable in the first record.

The record 500 may include more or less data than that illustrated in FIG. 5 and the record 500 may be organized or grouped differently than what is illustrated in FIG. 5. For example, historical transfer data may be separated from upcoming or scheduled transfer data.

Figure 6:
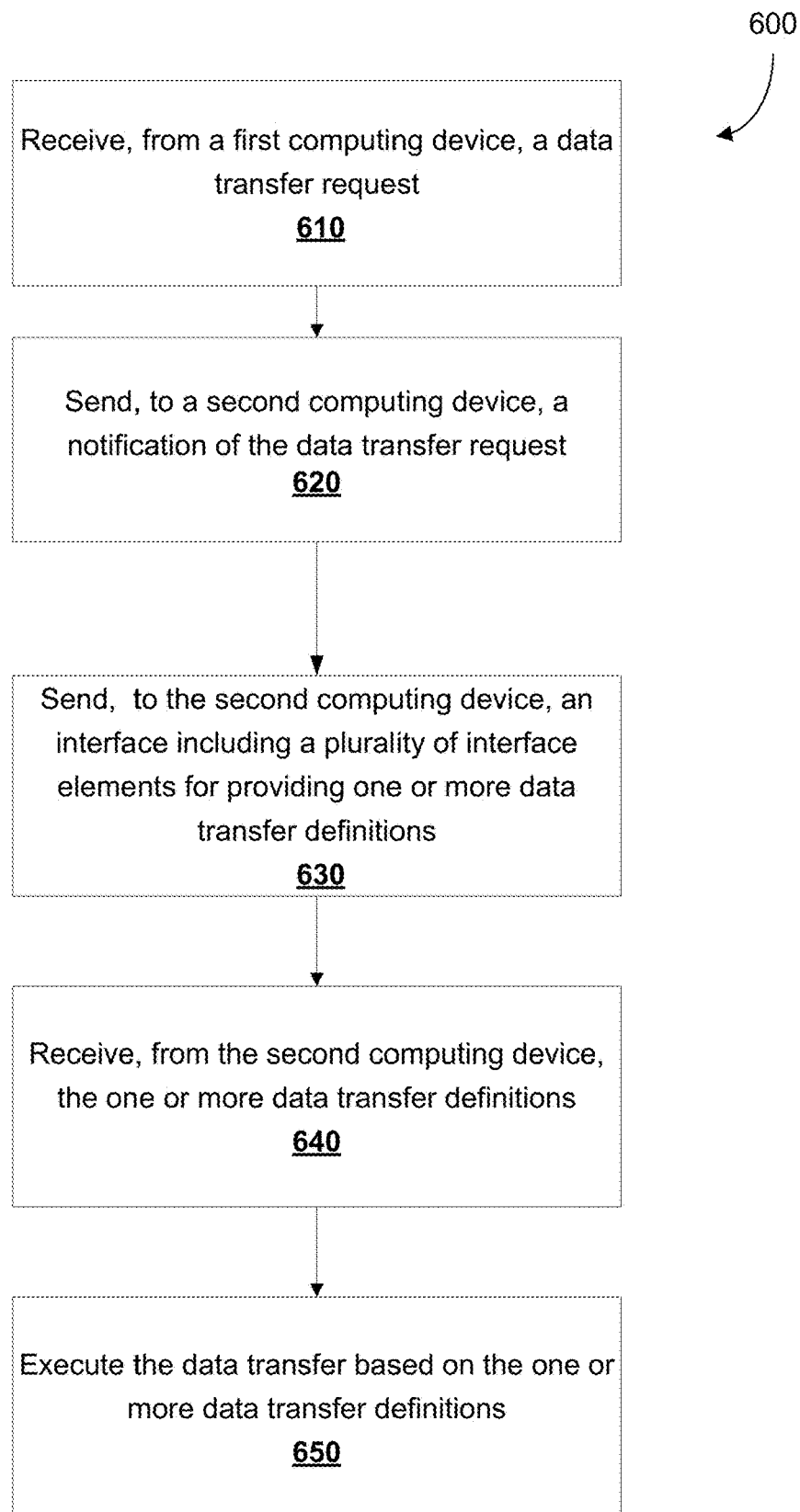
FIG. 6 is flowchart showing operations performed by a server in completing a data transfer according to an embodiment.

FIG. 6 is a flowchart showing operations performed by the server 130 in completing a data transfer according to an embodiment. The operations may be included in a method 600 which may be performed by the first server 130. For example, computer-executable instructions stored in memory of the first server 130 may, when executed by one or more processors, configure the first server 130 to perform the method 600 or a portion thereof.

At operation 610, the first server 130 receives, via the communications module 330 (FIG. 3) and from a first computing device, a signal representing a data transfer request. The first computing device may be the second server 140. The data transfer request may include an identifier defining what is requested to be transferred. The identifier may, in at least some implementations, be a numerical identifier. The numerical identifier may identify an amount of resources requested to be transferred.

The data transfer request may include an identifier of a record such as, for example, an account number and/or an alias of an account number such as a name or email address. In some embodiments, the data transfer request may include a transferor address, such as an email address or phone number, and/or may include another identification of a transferor. In some embodiments, the data transfer request may be an e-transfer request and as such the transfer address may be an email address or a mobile phone number.

At operation 620, the first server 130 sends, via the communications module and to a second computing device, such as the client device 110, a notification of the data transfer request. In some embodiments, the notification may comprise a short messaging service (SMS) message and/or a voice message sent to the transferor's phone number. In some embodiments, the notification may comprise an electronic message sent to an email address belonging to the transferor and/or via an account, belonging to the transferor, of a financial software application, such as a banking application.

The notification may be retrieved or otherwise obtained by the second computing device. When the transferor address is an email address, the electronic message may be sent to the transfer address as an email message. A user may retrieve the message using an email application executing on the second computing device. Put another way, an email application executing on the second computing device may be configured to retrieve the message and display the message on a display screen of the second computing device. Where the transferor address is a mobile phone number, the electronic message may be sent to the transferor address as a text or SMS message. A user may view the text or SMS message using an electronic messaging application executing on the second computing device. Put another way, an electronic messaging application executing on the second computing device may be configured to retrieve or otherwise obtain the message and display the message on a display screen of the second computing device. The email, text or SMS message may include a hyperlink that, when selected, may cause the second computing device to open a webpage or a mobile application to display the electronic message.

In some implementations, the notification may be or include an operating system level notification. The notification may be provided through an application the second computing device. For example, an application such a transfer initiation application stored in memory of the second computing device may obtain the notification from the first server 130 and cause it to be output to an output device of the second computing device.

At operation 630, the server 130 sends, via the communications module and to the second computing device 110, an interface for providing one or more data transfer definitions. For example, the interface may provide a plurality of interface elements allowing a user to select and/or define an amount to be transferred, a date of transfer and/or a time of transfer. In some embodiments, at least one interface element may be pre-populated based on the data transfer request. In some embodiments, at least one interface element may provide an option to define a time of day for the data transfer.

In some embodiments, operation 620 and operation 630 may comprise the same action. For example, the interface of operation 630 may serve to provide the notification of operation 620 and a separate notification may be omitted.

An example interface 700 is shown in FIG. 7. The interface may display information relating to the data transfer such as, for example, requestor name, invoice number, amount due and due date. In the embodiment of FIG. 7, the requestor name is "Generic Wholesale", the invoice number is "0483", the amount due is "$275.61" and the due date is "Feb. 1, 2021". The interface may include a first interface element 710 for defining a first data transfer definition, a second interface element 720 for defining a second data transfer definition, and a third interface element 730 for defining a third data transfer definition. In some embodiments, one or more interface elements may be pre-populated based on the data transfer request. For example, in the embodiment of FIG. 7, interface 700 depicts "payment amount" 710 as pre-populated with the amount "$275.61", which is equal to the "amount due", the requested transfer amount. Example interface 700 depicts "payment date" 720 as pre-populated with "Feb. 1, 2021", which is equal to the "due date", the requested transfer date. Example interface 700 depicts "payment time" 730 as pre-populated with "09:00:00".

Accordingly, in at least some implementations, the plurality of interface elements on the interface provided at operation 630 includes at least one interface element that is pre-populated based on the data transfer request. For example, one of the interface elements may be pre-populated based on the identifier in the data transfer request that defines what is requested to be transferred. The pre-populated interface element(s) may allow modification of the pre-populated interface element. For example, the operator may not wish to transfer all that is requested in the request for transfer and they may interact with an interface element to prevent the transfer of at least a portion of what was requested.

The plurality of interface elements may, additionally or alternatively, include at least one element providing an option to define a time of day for the data transfer. In some embodiments, the interface element for defining the time of day for the transfer allows the transfer date to be specified to the nearest minute. In some embodiments, the interface element for defining the time of day for the transfer allows the transfer date to be specified to the nearest second.

In some embodiments, prior to submitting the data transfer definitions via the interface, a user may accept one or more of the pre-populated data transfer definitions and/or may choose to modify one or more of the pre-populated data transfer definitions. For example, a user may realize that he does not have sufficient resources for the full amount of the data transfer to be executed at the pre-populated date and time. The user may therefore decide to submit a partial transfer amount of, for example, $200.00 and may define the first interface element accordingly. Additionally or alternatively, the user may decide to submit a transfer amount at an earlier or later date and may define the second interface element accordingly. Additionally or alternatively, the user may decide to modify the third interface element to select an earlier or later transfer time. For example, the user may recognize that he will not have sufficient available resources for the full amount of the data transfer at 9:00:00 on Feb. 1, 2021. As a result, the user may decide to engage in resource-generating activity, such as providing ride-share services, during the afternoon of Feb. 1, 2021, in order to acquire sufficient resources for the data transfer. The user may further decide to define the third interface element as 23:30:00 in order to provide himself with additional time within which to generate the required resources for the data transfer.

In some embodiments, a user may elect to use borrowed resources for the data transfer. When borrowed resources are used, the user may be required to, in the future, not only replenish the borrowed resources that were used, but also to transfer a further amount of resources to an account associated with the first server 130 (e.g., interest may be required). In some embodiments, the first server 130 may calculate the further amount of resources based on the elapsed time of use.

In some embodiments, when the data transfer request specifies a due date but not a transfer time, the interface may default the pre-populated transfer time based on predetermined criteria. In some embodiments, the pre-populated transfer time may be configured to be near an end of day on the due date. For example, the pre-populated transfer time may be configured to be within 30 minutes of midnight on the due date. By way of further example, the pre-populated transfer time may be configured to be within one hour of midnight. In some embodiments, the pre-populated transfer time may be configured to be at the close of business on the due date. For example, the pre-populated transfer time may be configured to be 18:00:00 (5:00 PM). In some embodiments, the transfer time may not be pre-populated.

The data transfer request may include limitations to the data transfer definitions. For example, the transferee may desire to limit the definable range of the second interface element 720 such that the user may not define a transfer date that is not within two weeks of the due date.

In some embodiments, after defining the data transfer definitions thorough the interface 700, a user may send the definitions to the server 130, for example, by pressing a "SUBMIT" button on the interface 700.

Returning to FIG. 6 and the method 600, at operation 640, the server 130 may receive, via the communications module and from the second computing device, the one or more data transfer definitions. At operation 650, the server 130 may execute the data transfer based on the one or more data transfer definitions. The server 130 may execute the transfer using a real time transfer protocol at the defined time of day.

The method 600 of FIG. 6 may be modified. For example, in one implementation, the first server 130 may determine whether the interface element that provides the option to define a time of day for the data transfer is to be provided and to only include such an interface element on the interface if it is determined that such an interface element is to be provided. This determination may be made based on various criteria. By way of example, in one implementation, the first server 130 may include the interface element when a real time transfer protocol can be used to make the transfer and to exclude the interface element when a real time transfer protocol can not be used to make the transfer. Put differently, the first server 130 may determine whether a real time transfer protocol may be used to execute the data transfer and may only include the interface element providing the option to define the time of day when it is determined that the real-time protocol may be used. That is, if it is determined that the real time transfer protocol is not available, such an interface element may be excluded.

The determination of whether the real time transfer protocol may be used to execute the data transfer may be based on one or more of an identity of a recipient, a system operator associated with the recipient and a type of the data transfer request. For example, the first server 130 may maintain or have access to one or more lists of system operators, recipients, and/or types of data transfer requests that support the real time transfer protocol and the first server 130 may use this list in order to determine whether the transfer may be made using the real time transfer protocol.

Other criteria apart from the availability of real time transfer protocol may be used in order to selectively include the interface element that provides the option to define a time of day in the interface. For example, in at least some implementations the first server 130 may include the interface element when a request associated with the request does not have what is requested to be transferred at the time of display of the interface. That is, since the option to input a time may be of lesser importance if a transferor already has sufficient resources to complete a requested data transfer, the option may only be provided when it is determined that the transferor cannot presently complete the transfer. If the customer presently has sufficient resources to complete a transfer, then the first server 130 may prefer not to accept input of a time for the transfer to occur. In this way, the first server 130 may manage computing resources, such as bandwidth, by making the transfer at any time on the transfer date when it is convenient, in terms of computing resource utilization, to do so. For example, if the first server 130 detects a period in which computing resources are under-utilized on the transfer date, the first server 130 may automatically complete the transfer.

In another example of a modification of the method 600 of FIG. 6, the first server 130 may be configured to permit a data transfer to be made from an account not having sufficient resources at the transfer date and time, and the transfer may be executed using borrowed resources. In some such embodiments, the date and/or the time of day upon which one or more borrowed resources was used may be recorded and used to determine an amount of resources that is to be returned to the first server 130 and/or a system operator of the first server 130. For example, a borrowed amount plus a further amount may need to be returned and the further amount of resources may be determined based upon the amount of elapsed time between the date and time of use and the date and time of replenishment. In some embodiments, the elapsed time may be calculated to the nearest hour. In some embodiments, the elapsed time may be calculated to the nearest minute. In some embodiments, the elapsed time may be calculated to the nearest second.

The further amount of resources may be determined based on a time period that is shorter than twenty-four hours. For example, an hourly modifier may be used in calculating interest on borrowed resources. Accordingly, the amount of resources may be calculated without rounding to the nearest day. The further amount of resources may be displayed on an interface provided by the first server 130 to the client device 110.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server comprising:
a communications module;
a processor coupled with the communications module; and
a memory coupled to the processor and storing processor-executable instructions which, when executed by the processor, configure the processor to:
receive, from a first computing device, a data transfer request;
send to a second computing device, an interface including a plurality of interface elements for providing one or more data transfer definitions, the plurality of interface elements including at least one interface element that is pre-populated based on the data transfer request, and, in response to determining that an entity of the second computer device does not have sufficient resources to complete the data transfer request, include at least one interface element providing an option to define a time of day for a data transfer that would not be provided if the entity of the second computer device has sufficient resources to complete the data transfer request;
receive, from the second computing device, the one or more data transfer definitions; and
execute the data transfer based on the one or more data transfer definitions, wherein the data transfer is executed using a real-time transfer protocol at the defined time of day.

2. The server of claim 1, wherein the at least one interface element that is pre-populated based on the data transfer request is pre-populated based on an identifier in the data transfer request, the identifier defining what is requested to be transferred.

3. The server of claim 2, wherein the at least one interface element that is pre-populated is configured to allow modification of the pre-populated interface element.

4. The server of claim 1, wherein the instructions further configure the processor to determine whether a real-time protocol may be used to execute the data transfer, and to include the at least one interface element providing the option to define the time of day in response to determining that the real-time protocol may be used.

5. The server of claim 1, wherein the instructions further configure the processor to include the at least one interface element providing the option to define the time of day in response to determining that a record associated with the data transfer request does not have what is requested to be transferred at a time of display of the interface.

6. The server of claim 1, wherein the plurality of interface elements includes at least one interface element providing the option to define a date for the data transfer.

7. The server of claim 1, wherein the at least one interface element providing the option to define a time of day allows definition to a nearest minute.

8. The server of claim 1, wherein the at least one interface element providing the option to define a time of day allows definition to a nearest second.

9. The server of claim 1, wherein the instructions further configure the processor to:
when the data transfer includes a borrowed resource, determine an elapsed time of use of the borrowed resource beginning with the defined time of day and the defined date of the data transfer.

10. The server of claim 9, wherein the instructions further configure the processor to:
determine an amount of resources to be transferred in a further transfer based on the elapsed time of use.

11. The server of claim 1, wherein the at least one interface element providing the option to define the time of day is pre-populated with a time that is within an hour of midnight.

12. A computer-implemented method, comprising:
receiving, from a first computing device, a data transfer request;
sending, to a second computing device, an interface the interface including a plurality of interface elements for providing one or more data transfer definitions, the plurality of interface elements including at least one interface element that is pre-populated based on the data transfer request, and, in response to determining that an entity of the second computer device does not have sufficient resources to complete the data transfer request, include the at least one interface element providing an option to define a time of day for a data transfer that would not be provided if the entity of the second computer device has sufficient resources to complete the data transfer request;
receiving, from the second computing device, the one or more data transfer definitions; and
executing the data transfer based on the one or more data transfer definitions, wherein the data transfer is executed using a real-time transfer protocol at the defined time of day.

13. The computer-implemented method of claim 12, wherein the at least one interface element that is pre-populated based on the data transfer request is pre-populated based on an identifier in the data transfer request, the identifier defining what is requested to be transferred.

14. The computer-implemented method of claim 12, wherein the at least one interface element that is pre-populated is configured to allow modification of the pre-populated interface element.

15. The computer-implemented method of claim 12, wherein the at least one interface element providing the option to define the time of day allows definition to a nearest minute.

16. The computer-implemented method of claim 12, wherein the at least one interface element providing the option to define the time of day allows definition to a nearest second.

17. The computer-implemented method of claim 12, further comprising: including the at least one interface element providing the option to define the time of day in response to determining that a record associated with the data transfer request does not have what is requested to be transferred at a time of display of the interface.

18. A non-transitory computer-readable storage medium comprising computer-executable instructions which, when executed, configure a processor to:
receive, from a first computing device, a data transfer request;
send, to a second computing device, an interface the interface including a plurality of interface elements for providing one or more data transfer definitions, the plurality of interface elements including at least one interface element that is pre-populated based on the data transfer request, and, in response to determining that an entity of the second computer device does not have sufficient resources to complete the data transfer request, include at least one interface element providing an option to define a time of day for a data transfer that would not be provided if the entity of the second computer device has sufficient resources to complete the data transfer request;
receive, from the second computing device, the one or more data transfer definitions; and
execute the data transfer based on the one or more data transfer definitions, wherein the data transfer is executed using a real-time transfer protocol at the defined time of day.

* * * * *